United States Patent Office 3,353,217
Patented Nov. 21, 1967

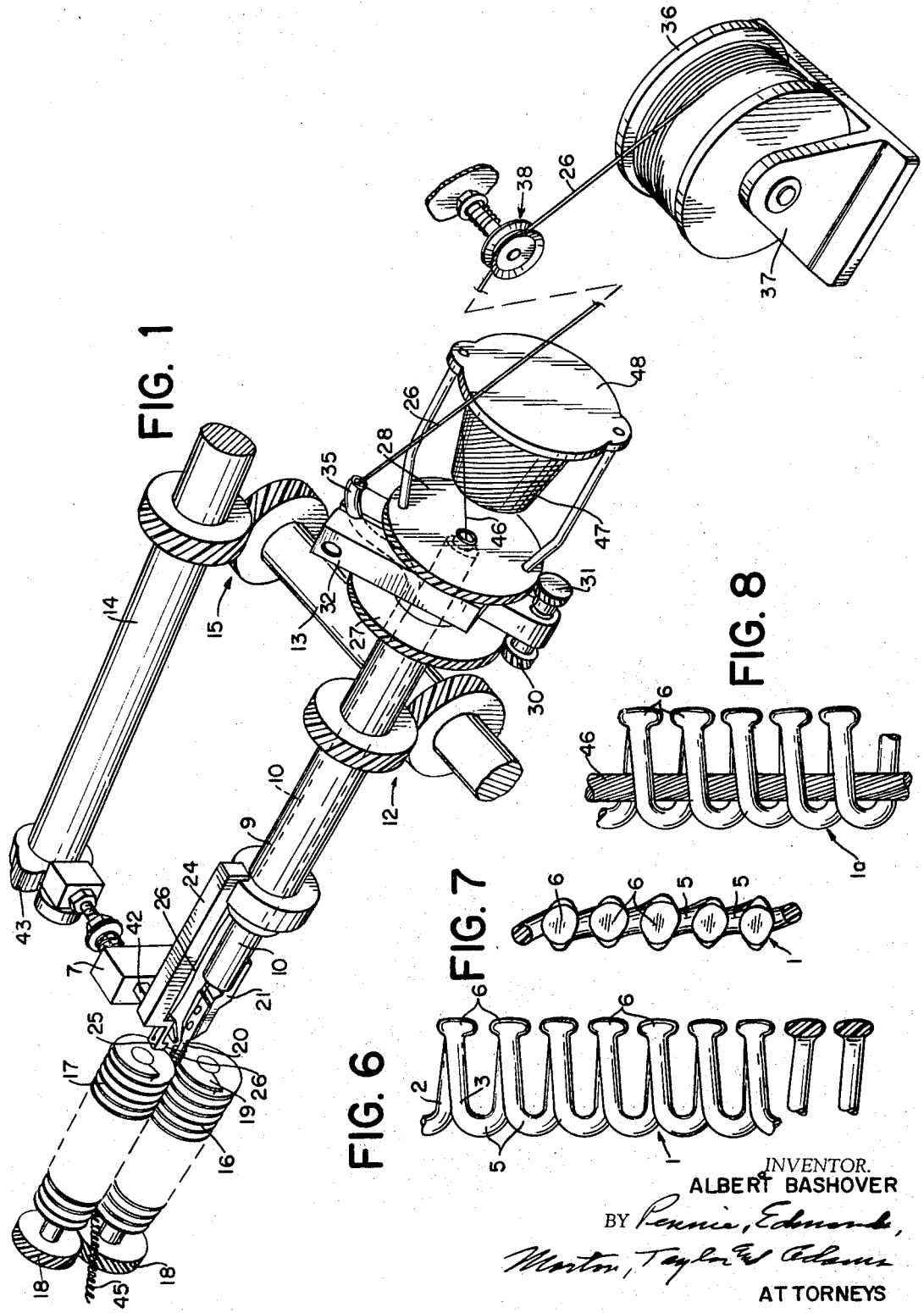

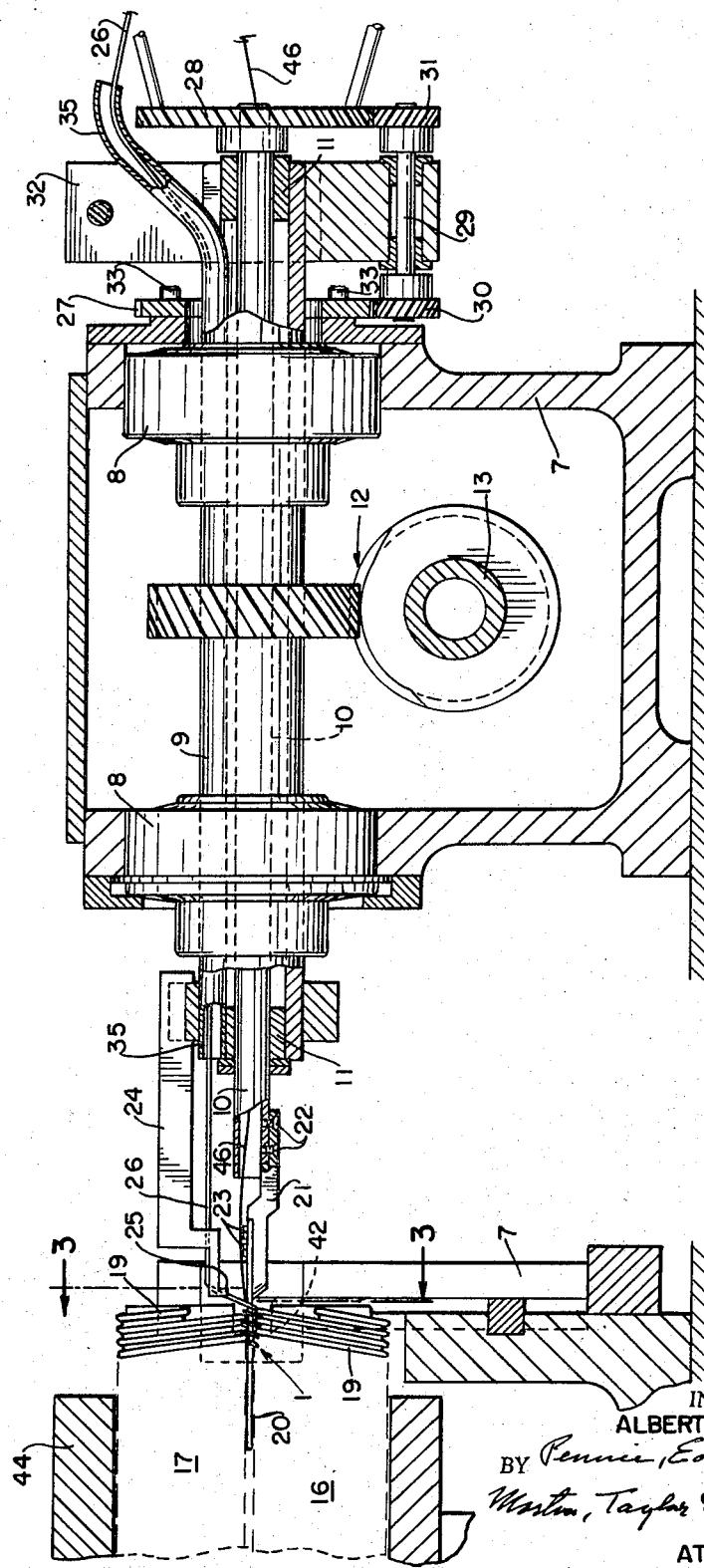

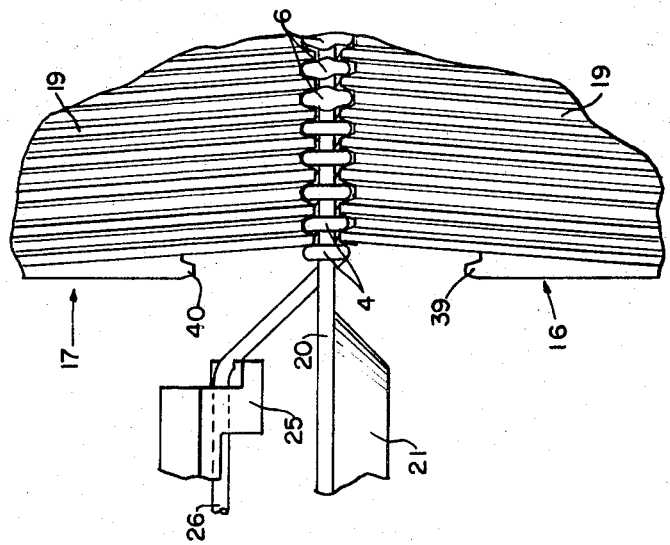
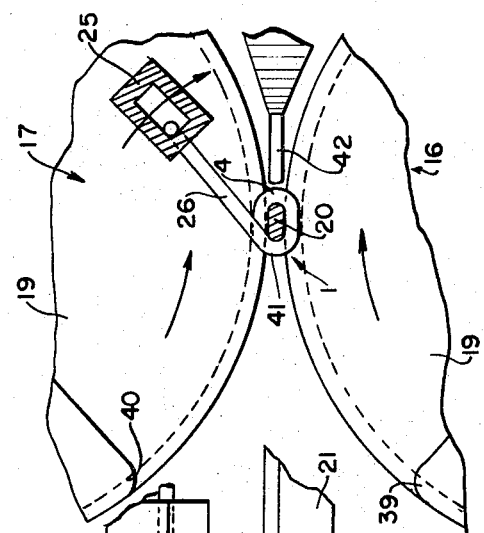
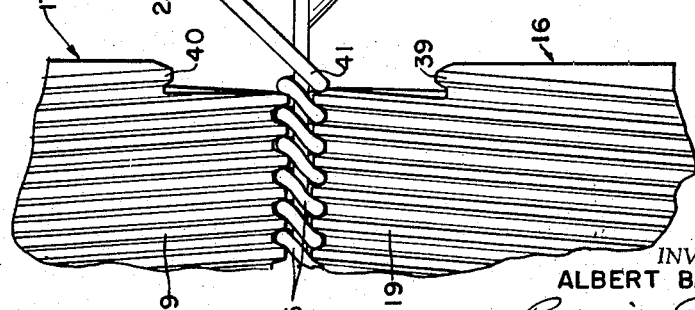

3,353,217
FORMING APPARATUS FOR HELICAL
SLIDE FASTENER ELEMENTS
Albert Bashover, Long Beach, N.Y., assignor to Ideal
Fastener Corporation, Long Beach, N.Y., a corporation of New York
Filed Apr. 15, 1966, Ser. No. 542,962
6 Claims. (Cl. 18—19)

ABSTRACT OF THE DISCLOSURE

Apparatus for forming helicoidal structures and particularly those which have a noncircular or oblong shape in cross section. More particularly the invention relates to apparatus for forming helicoidal, or helical, structures of this type which are provided with head formations along one edge and are capable of use as slide fastener elements.

---

Such elements when made of a plastic material such as a plastic filament that can be wound into helical form and then set so as to retain such shape are easily mounted on a stringer tape with their head members projecting laterally in a single plane and serving as coupling elements which, when two such tapes are placed with their heads facing one another can be engaged and released by means of a conventional slider.

Apparatus has heretofore been proposed such as disclosed in Potter et al. Patent 2,467,227 in which a filament is fed from a stationary source onto a rotating noncircular mandrel, the formed helical structure being delivered over the end of the mandrel after being successively heated and cooled for the purpose of setting the material.

In such apparatus the helicoidal structure is rotating as it is delivered from the apparatus, and must be severed into suitable lengths for further use. In the manufacture of slide fasteners however, it is important to be able to feed the helical slide fastener elements continuously from the forming machine to a further operation in the manufacture of the slide fasteners, such for example, as the securing of the helical elements to the stringer tape.

Also it is known that the plastic filament may be wrapped around a mandrel and carried between rotating screws where it is heated, and then cooled so as to cause it to maintain its shape. Heretofore however in such apparatus the mandrel was circular in cross section because the wrapping of the filament around it precluded any way of orienting the mandrel relative to the screws so as to deliver the filament to the threads of the screws. In some instances the mandrel was fixed in reference to the machine frame and it was then necessary to rotate the entire mass of the source of the filament around it. This source was usually a spool having considerable mass and thus limiting the speed of rotation of the machine and limiting its rate of production. Furthermore in some forms of plastic fasteners it is desired that a cord be inserted through the helix, and consequently a spool of cord must also be rotated, thus still further increasing the mass of the rotating parts of the machine.

A problem has also been presented in forming the first coil of filament around the mandrel inasmuch as this must be done outside of the rotating screws, and the shaped coil must then be securely positioned between the rotating screws.

In accordance with the present invention such difficulties have been overcome and, moreover, an apparatus has been provided in which not only can the filament material be fed to the apparatus from a stationary source of supply, but also the completed helical element is delivered in nonrotating condition and may be fed to another machine for performing the next step in the manufacture of the slide fasteners.

Any suitable filament or "thread" may be used which is formable into a helix by a simple winding operation, and which is capable of being set in any convenient way to cause it to retain its helical shape. Advantageously a monofilament of a thermoplastic material such as a polyamide resin, one of the "nylons," is used.

The invention is illustrated by way of example in the accompanying drawings in which:

FIG. 1 shows the apparatus in a diagrammatic projectional view;

FIG. 2 is a view of the principal portion of the apparatus in vertical section and drawn to a somewhat larger scale;

FIGS. 3, 4 and 5 are greatly enlarged fragmentary views showing the winding of the filament about the mandrel, FIG. 3 being a view in transverse section on line 3—3 of FIG. 2; FIG. 4 showing the parts illustrated in FIG. 3 as viewed from the left, and FIG. 5 showing the same parts as viewed from the right;

FIGS. 6 and 7 are greatly enlarged views of a fragment of the helical slide fastener element made by the apparatus as shown in side view and edge view respectively; and FIG. 8 is a view similar to FIG. 6 showing a modified form of slide fastener element.

Referring now to the accompanying drawings, and first to FIGS. 6 and 7, the helical fastener element indicated generally by reference numeral 1 which is produced by this machine is made from a filament having a diameter which is appropriate for slide fasteners. Element 1 consists of a series of coils having flat nearly parallel sides 2 and 3 so that the helix has a flat noncircular shape which may also be seen in FIG. 3. At one edge of the flat helix its sides 2 and 3 are interconnected by end portions 4 (FIG. 5) which are at right angles to the helix axis and are substantially parallel. At the opposite edge of the flat helix sides 2 and 3 are interconnected by end portions 5 (FIG. 4) which are oblique to the axis of the helix, although they are substantially parallel one to another.

The ends 4 which are perpendicular to the axis of the helix have flattened heads 6 the sides of which project beyond the thickness of the parallel sides 2 and 3 of the helix (FIGS. 6 and 8). A pair of the flat helical fastener elements 1 are secured to parallel stringer tapes by stitching, or otherwise, and with the row of heads 6 of each element facing one another. The elements are then secured together by means of a conventional slider which causes the facing rows of heads 6 on the edge of each helical element to interlock with one another.

Referring now to FIGS. 1 and 2 the apparatus includes a frame 7 and supported for rotation by means of bearing members 8 there is a hollow shaft 9. Within this shaft there is a concentric hollow shaft 10 which is held stationary in a manner to be described. Between these shafts there is a bearing at each end such as indicated diagrammatically at 11. The outer hollow shaft 9 is driven in rotation by means of helical gearing 12 from a cross shaft 13. Shaft 13 is in turn driven from a main shaft 14 through a second set of helical gears 15, the main shaft being driven by an electric motor, or otherwise.

At the left of the apparatus there are two cooperating screws 16. These are supported in parallel closely associated relation by means of suitable bearings (not shown). They are driven in opposite directions of rotation and at the same rotative speed by means of two helical gears 18. These gears are rotated by means of a third helical gear (not shown) which meshes with the lower helical gear 18 and which is secured to a second cross shaft (also not shown) which is parallel to shaft 13 and which is operatively connected to main shaft 14.

Screws 16 and 17 are provided with threads of the same pitch but of opposite hand as indicated in FIGS. 2, 4 and 5. The left-hand end of the inner hollow shaft 10 projects towards the right ends of screws 16 and 17, the center of this shaft lying in the common plane passing through the axes of screws 16 and 17. Shaft 10 carries at its left end a flat or noncircular mandrel 20 which may be mounted on the shaft by any suitable means such as mandrel holder 21 having screws 22 by which it is secured to shaft 10 and also having screws 23 by which the mandrel is secured to a flat surface on holder 21. Mandrel 20 is located centrally between the surfaces of screws 16 and 17 and substantially in the common plane passing through the axes of these screws. It projects a substantial distance into the passageway between these screws as shown in FIG. 2.

Mounted near the left-hand ends of the outer shaft 9, there is a winder member 24 which projects beyond the end of both shafts 9 and 10 and is provided at its free end with an eye portion 25 by which a filament 26 of plastic material is wound about mandrel 20 in a manner to be described.

In order to maintain mandrel 20 in stationary position while the winder 24 is applying the filament to mandrel 20, the set of gearing shown at the right of FIGS. 1 and 2 is provided. This includes two gears 27 and 28 of the same diameter and having the same number of teeth, and which are interconnected by means of a short shaft 29 and pinion gears 30 and 31 on its opposite ends which are of the same diameter. Pinions 30 and 31 mesh with the respective gears 27 and 28. Shaft 29 rotates in bearings which are in an aperture in a support 32 which is fixed near the right-hand end of the outer shaft 9 and which rotates therewith.

Gear 27 is stationary and is mounted on the right hand of frame 7 and may be arranged for angular adjustment thereon by means of recessed head cap screws 33. These screws may, if desired, pass through short arcuate slots (not shown) in gear 27.

By means of this gearing it will be understood that gear 28 will be held against rotation and will serve to maintain mandrel 20 which is supported on the opposite end of shaft 10 in stationary position.

Mounted on one side of the outer hollow shaft 9 which carries winder 24 there is a conduit tube 35 which extends from the left-hand end of shaft 9 towards the right and beyond the support 32 for the interconnecting shaft 29 between the two gears 27 and 28. At its right end conduit 35 is curved outwardly so as to clear the outer gear 28 and the end of the conduit is somewhat to the right of this gear.

The source of supply of the filament 26 is a spool 36 which is mounted for rotation in a bracket 37 which is fixed in position in any suitable manner. Filament 26 leaving spool 36 is carried through a conventional tensioning device 38 which is mounted in fixed position in any convenient way and the filament continues its course into the end of conduit 35 and thence to winder 24. It will be understood that the positioning of bracket 37 and tensioning device 38 is such that the filament as it leaves the tensioning device will be approximately in line with the extension of the axis of the two rotating shafts 9 and 10.

During the operation of the apparatus the outer shaft 9 carries the entrance to conduit 35 in a circle and consequently the filament 26 describes the surface of a cone the apex of which is at the tension device 38 which is about in line with the axes of shafts 9 and 10, and the base of the cone is described by the path of the entrance to conduit 35. Because of such rotation a twist is imparted to the filament between the time it leaves the tension device 38 and the time it is wound onto mandrel 20. However the strain in the filament due to such twist is removed by the application of heat, to be mentioned later, while the filament passes along the passageway between screws 16 and 17.

The filament 26 leaving eye 25 of winder 24 is carried around mandrel 20 and immediately enters the passageway between the threads 19 of the two rotating screws 16 and 17. The speed of rotation of these screws and the pitch of threads 19 is such that as each turn of filament is wound around the mandrel, the formed helix 1 will be advanced one pitch.

Referring to FIGURE 3 eye member 25 of winder 24 is rotating in the clockwise direction and filament 26 is being wrapped around mandrel 20. The filament has just turned about the left-hand edge of the mandrel (FIGURE 4), and the front edges 39 and 40 of the threads 19 of the lower and upper screws 16 and 17 immediately enclose the portion 41 of the filament and fix it in the desired sloping position parallel with the previously formed end portions 5 which are within the threads of the two screws (FIG. 4).

The position of eye 25 (FIGS. 4 and 5) is such as to lay the portion 41 at the desired angle, which is determined by the curves of the adjacent threads in the two screws 16 and 17. This immediate enclosure of the portion 41 as soon as it has been wrapped around the edge of mandrel 20 assures that the shaped helical coil will be properly formed and cannot escape from the passageway therefor between the two screws. It also assures that the advance of the flat helical coil from one pitch to another will take place at the edge of the flat coil which is opposite to the edge where the heads 6 are to be formed.

These heads 6 are formed by means of a hammer member 42 (FIGURES 1 and 3), the forward end of which is flat, or slightly convex as shown in FIG. 3. Hammer 42 slides in suitable supports in frame 7 of the machine and is actuated by means of a cam 43 which is mounted on main shaft 14 so that the hammer is actuated once for each revolution of shaft 9. Hammer 42 is located between the two screws 16 and 17 (FIGURE 3) and inwardly somewhat from the outer ends of these screws as will appear later, although its position can be varied to suit conditions. The operation of hammer 42 is to deform the end portion 4 of each turn of helical member 1 while it is in engagement with mandrel 20. This is shown more particularly in FIGURES 3 and 5 and as a result of such deformation the flattened heads 6 with their laterally protruding portions shown in FIGURES 5 and 6 are formed. Since only two heads 6 are shown in FIGURE 5 the hammer 42 is located opposite the valleys between the 5th and 6th threads of screws 16 and 17.

As shown in FIGURE 3 mandrel 20 is located in line with the centers of screws 16 and 17. It will be understood that the mandrel can be offset from this position if desired in order to give the helical element 1 a different shape. Thus mandrel 20 may be shifted to a position slightly either to the left or the right of the position shown in FIGURE 3. This may be done by moving the two parts of frame 7 shown in FIG. 2 relative to each other in a horizontal plane, the right-hand part supporting the mandrel and the left-hand part supporting screws 16 and 17.

The two screws 16 and 17 are enclosed within a housing 44, only a portion of which is shown (FIGURE 2) but which, it will be understood, extends throughout the lengths of the two screws. Associated with the in-feed or right end portion of housing 44 there is a heating means such as an electrical element (not shown) by which the formed helical element 1 within the passageway between the screws is softened, and following such heating means cooling is also provided. In this way, the helical element is set in its formed condition as shown in FIG. 6, in which condition it emerges as shown at 45 in FIG. 1, and may continue to another location to be united with a second and cooperating helical element, and then to be applied and secured to the stringer tapes as previously mentioned.

Under certain circumstances it is desirable to provide the helical element 1 with a cord passing lengthwise therethrough such as shown at 46 in FIG. 8. The helical element 1a of this figure is similar to the element 1 of FIGURES 6 and 7 except for the presence of this cord.

The apparatus provides for the introduction of cord 46 into the helical element as it is formed. The cord supply is stationary as well as the filament supply 36. The cord supply is from a spool 47 (FIG. 1) which is carried by spool holder 48 which is supported on the outer gear 28 so that both the spool holder and spool 47 are held in stationary position. The cord 46 from spool 47 enters the right-hand end of hollow inner shaft 10, and passing through the shaft to the opposite end is carried alongside mandrel 20 and introduced into the helical element 1 as it is being wound.

Should it be desired to shift the mandrel 20 lengthwise with respect to the screws 16 and 17 this can be done by providing lengthwise slots (not shown) for the two screws 22 by which the mandrel holder 21 is mounted on nonrotating shaft 10. Also by providing arcuate slots (previously referred to but not shown) in stationary gear 27 through which the supporting screws 33 pass, the angular position of gear 27, and thereby the angular position of mandrel 20 may be altered to place mandrel 20 perpendicular to the plane through the axes of screws 16 and 17, or for any other purpose.

By this apparatus both the filament supply and the cord supply (if used) are mounted in stationary position so that they do not influence the mass of the rotating parts of the apparatus. Furthermore the finished helical fastener element 45 leaves the apparatus in a continuous nonrotating formation so that it can be readily supplied or fed to the following operation in the manufacture of sliding clasp fasteners.

I claim:

1. Apparatus for forming a helical structure including a pair of parallel screws having threads which cooperate to form between them a passageway to receive a helical filament, mechanism for forming into a helix and delivering to one end of said passageway a filament of formable and settable material, said mechanism comprising inner and outer concentric shafts having their common axis in line with said passageway, a mandrel mounted axially on the end of the inner shaft and projecting into said passageway between said screws, a winder member mounted on the outer shaft for winding the filament about the mandrel close to the ends of the screws, and a filament conduit alongside of and carried by the outer shaft for delivering the filament to the winder, means for supplying filament to the outer end of said conduit, means for rotating the outer shaft and said screws, means for maintaining the mandrel in non-rotating position, and means for setting the formed helical structure.

2. Apparatus for forming a helical structure as set forth in claim 1 including means for mounting the mandrel in offset position with respect to the center line between the two screws so as to modify the shape of the formed helix.

3. Apparatus for forming a helical structure as set forth in claim 1 in which the means for maintaining the mandrel in nonrotating position comprises two similar gears disposed parallel to each other on a common axis, one gear being secured to the mandrel supporting shaft and the other gear being fixed in stationary position, interconnecting means between these gears including a shaft having equal size pinions secured thereto, and means arranged to rotate with the outer concentric shaft for supporting the pinion shaft with its pinions in constant mesh with said respective gears.

4. Apparatus for forming a helical structure as set forth in claim 3 in which the winder lays the filament about the mandrel at an angle such that the opposite ends of the portion of the helix at one edge of the mandrel will lie in the spaces between nonaligned but adjacent threads of the upper and lower screws, the slope of such portion corresponding to the angle at which the winder lays the filament about the mandrel.

5. Apparatus for forming a helical structure as set forth in claim 1 wherein the means for supplying filament to the outer end of said conduit comprises a filament supply source mounted in stationary position beyond the outer ends of said shafts.

6. Apparatus for forming a helical structure as set forth in claim 5 in which a tensioning device for the filament is arranged between the source of filament material and the ends of said shafts and is disposed approximately in line with the common axis of said shafts, the rotation of said filament conduit carried by the outer shaft causing the filament to describe the surface of a cone the apex of which is at the tensioning device.

References Cited

UNITED STATES PATENTS

| | | | |
|---|---|---|---|
| 3,054,149 | 9/1962 | Streicher | 18—13 X |
| 3,077,001 | 2/1963 | Yoshida | 18—13 X |
| 3,121,256 | 2/1964 | Fleisher | 18—19 X |
| 3,262,157 | 7/1966 | Fiyisaki | 18—19 |

WILLIAM J. STEPHENSON, *Primary Examiner.*

J. SPENCER OVERHOLSER, *Examiner.*